Dec. 9, 1952
J. B. MILLER
2,620,797
INJECTOR FOR MEDICAMENTS
Filed July 25, 1951
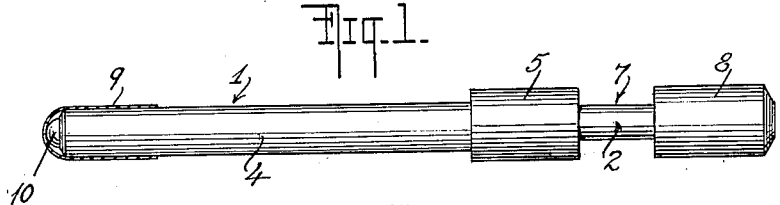
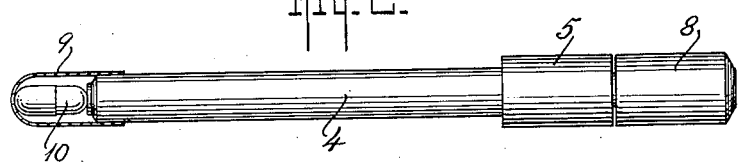
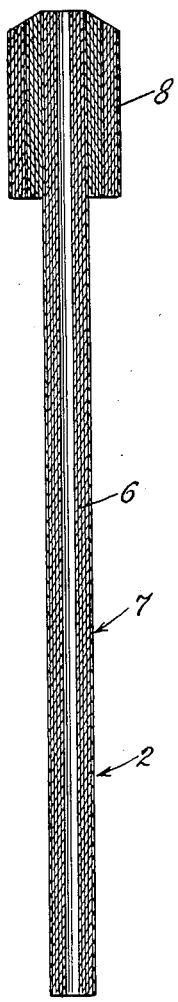
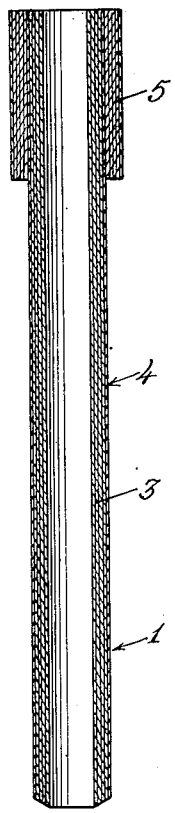
INVENTOR.
JOSEPH B. MILLER
BY
Klein + Hart
ATTORNEYS Patented Dec. 9, 1952

2,620,797

UNITED STATES PATENT OFFICE 2,620,797

INJECTOR FOR MEDICAMENTS

Joseph B. Miller, Mobile, Ala.

Application July 25, 1951, Serial No. 238,525

4 Claims. (Cl. 128—264)

This invention relates to a device for injecting medicaments in the form of tablets, pills, powders or liquids in capsules into cavities in the human body as for instance the rectum or vagina.

The object of the invention is to provide an inexpensive injector intended for a single use and readily destructible. The device is relatively strong for its intended use and free of fragile material such as glass, readily insertable and withdrawable without danger of injuring the patient. It may be made with simple machinery in large quantities under sanitary conditions from rolls of sheet material. The advantages arising out of its use are hereinafter set forth.

In the drawings Fig. 1 is a top view of the actual size of the ejector with the medicament, in the form of a capsule, carried at its end, showing the relation of the parts when arranged for insertion into a cavity of the human body; Fig. 2 is a view similar to Fig. 1 showing the relation of the parts after the injector has been so inserted and the ejector operated; Fig. 3 is a longitudinal section of the ejector and Fig. 4 a longitudinal section of the sleeve.

The device consists of a sleeve 1 and an ejector 2. The sleeve 1 is illustrated as made from a multiplicity of laminated windings 3 of paper providing a wall of about $\frac{1}{32}$ of an inch in thickness and a bore of about $\frac{3}{8}$ of an inch in diameter. Such a sleeve is stiff enough for insertion into a cavity such as the rectum without bending or collapsing. The inner laminations are not adhered but it is preferred to adhere the inner end of the first winding to the second winding. The outer surface of the windings is covered with a suitable smooth anti-friction covering 4 such as cellophane, plastic, wax or the like. One end of the sleeve is provided with a collar 5 which may also be made of laminated windings of paper. The ejector 2 is likewise made of laminated wound paper 6 covered with a like smooth, anti-friction covering 7. The ejector 2 is likewise provided with a collar 8. The length of the ejector from the base of the collar 8 to its lower end is sufficient to reach from the top edge of the sleeve to the lower edge thereof. A body heat dissolvable cup 9 of gelatin or like material is provided to fit frictionally slidably over the end of the sleeve and confine a medicament 10, shown in the form of a capsule in Figs. 1 and 2, at the end of the sleeve. The capsule 10 as illustrated in Fig. 1 fits in the bore of the sleeve against the lower end of the ejector 2 and the cup 10 is in sliding engagement with the outer surface of the sleeve holding the capsule in place in the bore of the sleeve. When the ejector is pushed forwardly and the collars 5 and 8 contact, the capsule 10 is thrust forwardly and out of the sleeve. The end of the capsule engages the rounded end of the cup 9 and slides it forwardly to the position shown in Fig. 2 in which the cup still remains in overlapped relation to the sleeve.

The injector is inserted into a body cavity with the parts in the relation shown in Fig. 1 and then the ejector is pushed forwardly bringing the parts to the relation shown in Fig. 2. The capsule 10 when the ejector is operated acts as an extension thereof engaging the cup and thrusting it forwardly co-extensively with the extent of movement of the capsule. The attendant then pulls backwardly upon the sleeve which causes the sleeve to be withdrawn entirely from the cup 9 leaving the capsule 10 and the cup 9 within the cavity usually with the capsule 10 still within the cup 9. The walls of the cavity exert sufficient pressure on the cup 9 to keep it from being removed with the injector. The body heat dissolves the material of the capsule 10 freeing the medicament for therapeutic action and also dissolves the cup 9 thereby disposing of it.

The injector is supplied to the physician with the sleeve and ejector assembled. The physician drops the medicament tablet, pill or capsule into the cup 9 and then slides the cup over the end of the sleeve.

The injector may be destroyed, or otherwise disposed of, after a single use.

The injector parts—the sleeve and ejector—may also be made of spirally wound paper in the manner in which soda straws are formed or it may be made of a thin fairly rigid section of paper of composite tubing, but it is desirable to apply to the sleeve an outer covering of a smooth, non-friction readily slidable material.

The length of the cup 9 may be varied with respect to its overlap of the sleeve in order that upon operation of the ejector the cup is thrust entirely from the sleeve and deposited in the cavity.

I claim:

1. An injector for depositing medicaments into cavities of the human body comprising a sleeve constituted of wound superimposed laminations of paper, a paper collar at one end of said sleeve, an ejector constituted of superimposed laminations of paper, having sliding arrangement within the bore of said sleeve, a paper collar at an end of said ejector, the outer surface of said sleeve having a smooth non-friction covering, said collars being adapted to abut when the ejector is pushed to its maximum extent into said sleeve, the end of said ejector within the sleeve constituting a seat for a medicament, a body heat dissolvable cup, fitting over the lower end of said sleeve and adapted to loosely support said medicament and confine it within said cup, the cup being of such length that when the end of the ejector forces the medicament beyond the lower end of the sleeve the cup remains seated upon the end of the sleeve.

2. An injector for depositing medicaments into cavities of the human body comprising a sleeve, an ejector having sliding arrangement with the bore of said sleeve, the outer surface of said sleeve having a smooth non-friction covering, the end of said ejector within the sleeve constituting a seat for a medicament, a body heat dissolvable cup, fitting over the lower end of said sleeve and adapted to loosely support said medicament and confine it within said cup, the cup being of such length that when the end of the ejector forces the medicament beyond the lower end of the sleeve the cup remains seated upon the end of the sleeve.

3. An injector for depositing medicaments into cavities of the human body comprising a sleeve, an ejector having sliding arrangement with the bore of said sleeve, the outer surface of said sleeve having a smooth non-friction covering, the end of said ejector within the sleeve constituting a seat for a medicament, a body heat dissolvable cup, fitting over the lower end of said sleeve and adapted to loosely support said medicament and confine it within said cup.

4. An injector of the character set forth in claim 3 in which the sleeve and ejector are made of destructible material.

JOSEPH B. MILLER.

REFERENCES CITED

The following references are of record in the file of this patent:

UNITED STATES PATENTS

| Number | Name | Date |
|---|---|---|
| 1,582,201 | Whittaker | Apr. 27, 1926 |
| 2,516,846 | Betz | Aug. 1, 1950 |

FOREIGN PATENTS

| Number | Country | Date |
|---|---|---|
| 116,357 | Australia | Dec. 23, 1942 |